United States Patent [19]
Walker et al.

[11] Patent Number: 6,053,277
[45] Date of Patent: Apr. 25, 2000

[54] SILENCER ASSEMBLY FOR PRESSURIZED GASES

[75] Inventors: Brian Walker, Holly Hall, Sandhoe, Hexham, Northumberland, NE46 4LX; Matthew David Rowe, Morpeth; Richard Lawrence Taggart, Chester-le-Street, all of United Kingdom

[73] Assignee: Brian Walker, United Kingdom

[21] Appl. No.: 09/058,241

[22] Filed: Apr. 10, 1998

[51] Int. Cl.[7] ........................................ F01N 1/00
[52] U.S. Cl. .......................................... 181/254; 181/237
[58] Field of Search .................................... 181/253, 254, 181/237, 226, 230, 229, 236, 251, 257, 258, 277, 278

[56] References Cited

U.S. PATENT DOCUMENTS

| 1,747,014 | 2/1930 | Kersey | 181/254 |
| 4,161,996 | 7/1979 | Dolejsi | 181/230 |
| 5,489,753 | 2/1996 | Gibel | 181/230 |

FOREIGN PATENT DOCUMENTS

| 0119047 | 9/1984 | European Pat. Off. . |
| 1213206 | 11/1970 | United Kingdom . |
| 97/05368 | 2/1997 | WIPO . |

*Primary Examiner*—Khanh Dang
*Attorney, Agent, or Firm*—Larson & Taylor

[57] ABSTRACT

A silencer assembly primarily for the passage therethrough of exhaust gases from an adsorption dryer tower comprises a silencer element to one end of which pressurized gas is directed from an outlet, a control valve downstream of the silencer element, and means for restricting the flow of pressurized gas from the outlet to atmosphere through the silencer element, the arrangement being such that, when the pressure of the gas from the outlet exceeds a predetermined value, the control valve is closed and gas flows from the outlet into and through the silencer element to atmosphere, and, when the pressure of gas from the outlet falls to said predetermined value, the control valve opens and the gas flows from the outlet through the control valve to atmosphere, by-passing the silencer element.

5 Claims, 1 Drawing Sheet

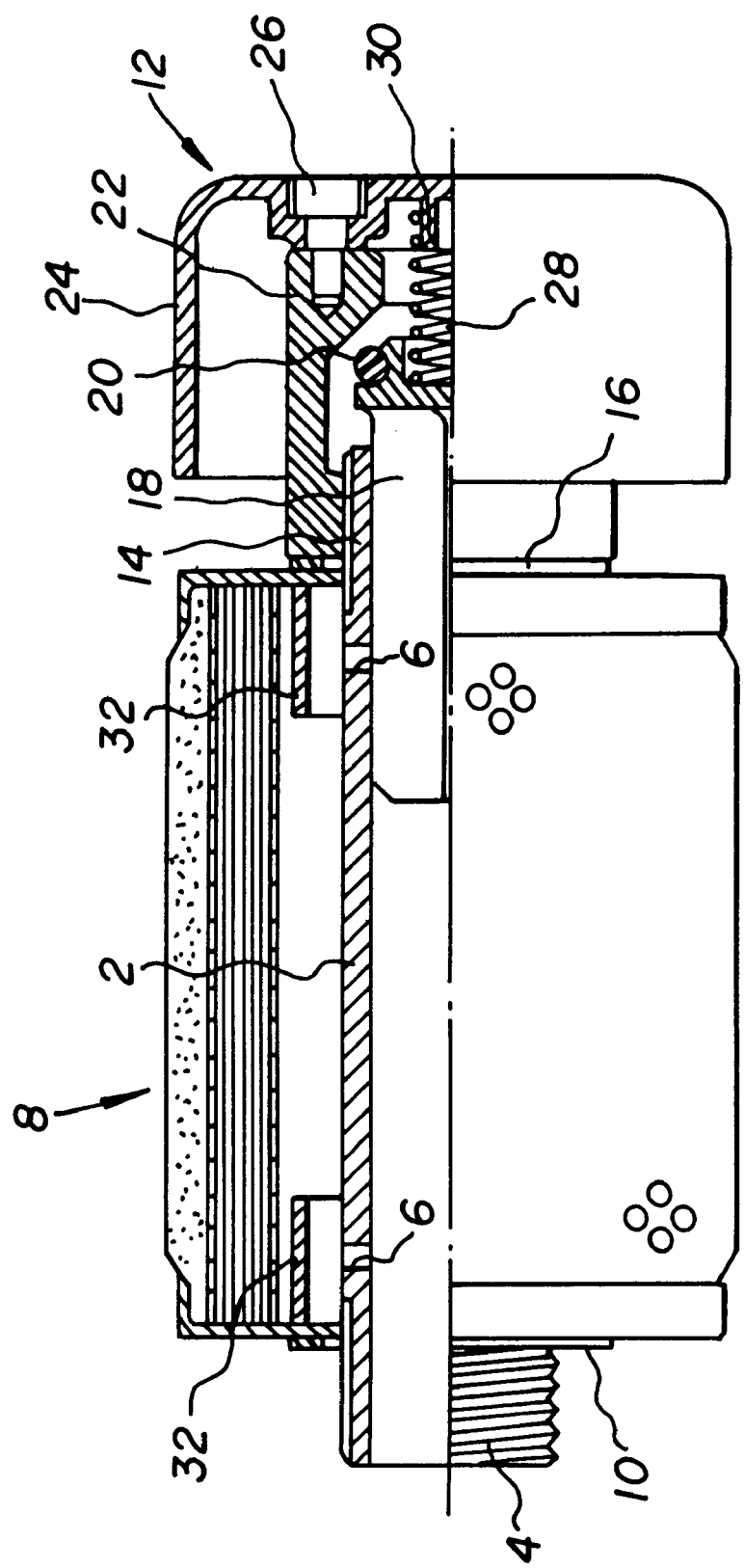

SILENCER ASSEMBLY FOR PRESSURIZED GASES

BACKGROUND OF THE INVENTION

This invention relates to silencer assemblies for pressurised gases, and has particular, though not exclusive, application to silencer assemblies for use on adsorption gas dryers.

Adsorption dryers for compressed air and gases have been commercially available for many years, and are widely used throughout the world. Although other types of dryers such as deliquescent, membrane and refrigeration dryers, are available, they cannot provide the low pressure dewpoint achieved by adsorption dryers and which is essential for many applications. For instance, a refrigeration dryer can offer a pressure dewpoint of +3 degrees C., whereas an adsorption dryer can give a pressure dewpoint of −70 degrees C.

Normally adsorption dryers employ two containers or towers of desiccant material, commonly known as beds, one of which is 'on stream' drying the gas while the other is being regenerated, although single and multi tower systems are also used. In a dual tower dryer, the gas to be dried is passed continuously through one desiccant bed in one direction during the drying cycle, and then, after a predetermined time interval when the bed is considered to have adsorbed sufficient moisture, the inlet gas is switched to the second desiccant bed, and the first desiccant bed is regenerated by heating and/or by evacuation and/or by passing a purge gas therethrough, usually in reverse flow direction.

Adsorption dryers are available in two distinct types, namely heat regenerative and heatless. Heat regenerative, as the name implies, uses heat in one form or another to reactivate the wet desiccant bed, normally in conjunction with a dry purge gas flow from the onstream bed. The heatless dryer uses a purge flow of dry gas, which is usually a proportion of gas from the drying cycle tower and which is passed through the regenerating tower at a lower pressure. The amount or percentage of this dry purge gas is generally directly proportional to the pressure in the regenerating tower.

Furthermore, the regenerating tower pressure is a function of the back pressure created by the desiccant bed, the associated exhaust valve and the associated exhaust silencer as the purge gas strips the moisture from the bed and exits the dryer system.

Hitherto, manufacturers of adsorption dryers have usually incorporated commercially available silencers which, as they become blocked with liberated desiccant dust and moisture, increase the back pressure and hence raise the regeneration tower pressure. For a heatless dryer, this increasing back pressure reduces the purge flow, which, in turn, adversely affects the performance of the dryer unit. For heat-reactivated dryers which utilise external blowers, either a costly positive displacement blower has to be used or, for a fan type blower, the purge gas flow is again reduced which adversely affects performance.

In an effort to overcome these problems, manufacturers have incorporated coarser silencers which, although not blocking as quickly, are very noisy, and are often in contravention of local or national noise regulations. Another way of overcoming the problem is to use two separate exhaust valve systems in which one small valve is used to depressurise the tower through a silencer, after which a larger valve opens to vent the tower to atmosphere. This is a costly solution, in that, not only is another valve system required, but also more complex and costly control systems are required. Furthermore, if the small silencer blocks then there is a chance that the larger valve will open before the tower has depressurised, causing excessive noise and damage to the desiccant.

SUMMARY OF THE INVENTION

It is an object of the invention to provide a silencer assembly which overcomes the aforementioned problems, and in particular which is capable of controlling depressurisation of an associated drying tower without the risk of build up of undesirable back pressure therein.

According to the present invention, there is provided a silencer assembly for pressurised gas comprising a silencer element to which pressurised gas is directed from an outlet, a control valve downstream of the silencer element, and means for restricting the flow of pressurised gas from the outlet to atmosphere through the silencer element, the arrangement being such that, when the pressure of the gas exceeds a predetermined value, the control valve is closed and gas flows from the outlet into and through the silencer element to atmosphere, and, when the pressure of gas falls to said predetermined value, the control valve opens and the gas flows from the outlet through the control valve to atmosphere, by-passing the silencer element.

In a preferred embodiment of the invention, the restricting means comprises a tube one end of which is connected to the outlet and having a plurality of orifices therein feeding into the interior of the silencer element.

Conveniently the assembly includes baffle means internally of the silencer element and adjacent said orifices positioned to deflect incoming gas toward the central regions of the silencer element.

Preferably the control valve includes a shuttle member slidably mounted in the other end of the tube and carrying a sealing ring thereon for co-operation with a seat in the valve, and resilient means urging the shuttle member into a normal rest position in which the sealing ring is disengaged from the seat and whereby the bore of the tube is connected to atmosphere by way of the valve, the arrangement being such that, when the pressure of gas within the tube exceeds said predetermined value, said pressure urges the shuttle member into a displaced position against the bias of the resilient means and in which the sealing ring sealingly engages the valve seat to close the flow path from the bore of the tube through the valve to atmosphere.

The resilient means may comprise a coiled spring.

BRIEF DESCRIPTION OF THE DRAWING

The FIGURE shows a silencer assembly according to the invention partially in vertical section.

DESCRIPTION OF THE PREFERRED EMBODIMENT

This invention is applicable to heatless or heat reactivated, upflow or downflow types of adsorption dyers. In addition, the concept can be applied to any type and size of exhaust valve/regeneration system. However, for the purposes of this description, a heatless downflow dryer utilising one inch diameter diaphragm exhaust valves is used as an example.

Referring to the drawing, the illustrated silencer assembly comprises a tube 2 which is threaded at both ends, one end 4 being screwed into the outlet port of the exhaust valve of an associated drying tower (not shown). Two pairs of diametrically-opposed orifices 6 are drilled in the tube 2, one pair adjacent each end of the tube 2 for reasons which will become apparent.

An annular silencer element indicated generally at 8 slides over the tube 2 until a gasket 10 on one end thereof abuts the exhaust valve, the assembly being completed by a valve mechanism indicated generally at 12 which is screwed onto the other end 14 of the tube 2 to abut a further gasket 16 on the other end of the silencer element 8.

The valve mechanism 12 comprises a shuttle member 18 guided for sliding movement in the other end of the tube 2 and carrying an O-ring seal 20 thereon external of the tube 2, a valve seat 22 screwed onto the other end 14 of the tube 2 to abut the gasket 16 and an end cap 24 secured to the valve seat 22 by way of two stand-offs and two cap head screws 26. A coil spring 28 located on a central spigot 30 within the end cap 24 reacts between the end cap 24 and the shuttle member 18 to urge said shuttle member 18 to a normal rest position shown in the drawing in which the O-ring seal 20 thereon is disengaged from the valve seat 22 and there is a flow path from the bore of the tube 2 around the shuttle member 18, through the centre of the valve seat 22, into the volume between the valve seat 22 and the end cap 24, and thence around the two stand-offs, along the outside of the valve seat 22 and out of the open end of the end cap to atmosphere.

The end caps of the silencer element 8 carry deflector elements or baffle tubes 32 positioned internally of the element 8 to be spaced from and cover the orifices 6, again for reasons which will become apparent.

The described silencer assembly operates as follows. On opening of the exhaust valve to which the silencer assembly is attached, high pressure air or gas enters the tube 2 through the end 4 thereof, the pressure of this gas forcing the shuttle member 18 to the right as viewed in the drawing against the bias of the spring 28 and whereby the O-ring seal 20 is urged into sealing engagement with the valve seat 22. Thus the only outlet for the pressurised gas from the bore of the tube 2 is by way of the orifices 6, flow through these orifices 6 effecting controlled depressurisation of the associated drying tower.

As the pressurised gas exits the orifices 6, it is directed by the baffle tubes 32 towards the central region of the interior of the silencer element 8, thereby to prevent erosion of the fibrous media of the element 8 that would otherwise occur if the pressurised gas impinged directly thereupon.

The gas then exits through the fibrous media, and the noise level is thereby considerably reduced with the silencer element 8 acting as a true silencer.

It will thus be appreciated that the combination of the orifices 6 in the tube 2 and the baffle tubes 32 in the silencer element 8 serve to control the flow of pressurised gas from the exhaust valve to atmosphere through the media of the element 8, and therefore provide for controlled and gradual depressurisation of the associated tower.

Once the drying tower has depressurised to a predetermined level, and the exhaust gas pressure has fallen to, for example, of the order of 500 mbar, the resilience of the spring 28 exceeds the gas pressure applied to the shuttle member 18, and the spring 28 then urges the shuttle member 18 to the left as viewed in the drawings to disengage the O-ring seal 20 from the valve seat 22.

The relatively low pressure gas is then able to escape from the bore of the tube 2 around the shuttle member 18 and out of the end cap 24 to atmosphere as detailed above, thereby by-passing the silencer element 8 under these low pressure conditions.

Thus it will be appreciated that, as the exhaust air or gas by-passes the silencer element 8 for the majority of the operating time of the associated drying tower, the life of the silencer element is significantly prolonged compared with an element in continuous use. Furthermore, and should the element 8 need replacing, this is easily achieved merely by unscrewing the valve mechanism 12 from the end 14 of the tube 2, removing the used element 8, and re-assembling with a new silencer element.

By maintaining a minimal back pressure on the regeneration tower throughout the life of the silencer element 8, purge flow is kept constant whereby dryer performance is maintained.

The precise construction of the assembly of the invention can vary from that described and illustrated. The means for controlling the depressurisation of the associated tower may be other than orifices 6 in a tube 2 which are effectively upstream of the gas flow through the silencer element. For example the high pressure gas may flow into the interior of the silencer element, through the media, and thence through restricting orifices in the outer shell of the silencer element, effectively downstream of the silencer assembly. Alternatively the orifices for controlling depressurisation may be located independently of the silencer element upstream of said element.

Clearly the precise construction and operation of the by-pass valve mechanism may be other than as shown, providing the mechanism closes and opens in dependence upon high and low pressures.

Thus there is provided a silencer assembly which controls the depressurisation of, and the noise level from, an associated tower by means of a silencer element, after which the silencer element is by-passed to allow a free flow of exhaust gases with negligible back-pressure. The system is fully automatic, requires no additional controls, and will only by-pass the silencer element when a preset, safe pressure within the tower is reached. The low back pressure within the tower, as well as maintaining dryer efficiency and saving energy, enables lower cost fan-type blowers to be used for heat-reactivated versions instead of costly positive displacement types.

The invention eliminates the aforementioned problems associated with current commercially available silencers when used on desiccant air dryers. It is to be emphasised that silencer assemblies of the invention have numerous other applications, such as vent valves on receivers, ring main vent valves and on any other system which requires safe and controlled depressurisation following the opening of an exhaust valve. By controlling depressurisation in the manner detailed above, noise and back pressure are eliminated on a permanent basis.

What we claim and desire:

1. A silencer assembly for depressurising an associated chamber comprising a silencer element to which pressurised gas is directed from an outlet, a control valve downstream of the silencer element, means for restricting the flow of pressurised gas from the outlet to atmosphere through the silencer element, the arrangement being such that, when the pressure of the gas exceeds a predetermined value, the control valve is closed and gas flows from the outlet into and through the silencer element to atmosphere, and, when the pressure of gas falls to said predetermined value, the control valve opens and the gas flows from the outlet through the control valve to atmosphere, by-passing the silencer element.

2. An assembly as claimed in claim 1 in which the restricting means comprises a tube one end of which is connected to the outlet and having a plurality of orifices therein feeding into the interior of the silencer element.

3. An assembly as claimed in claim 2 and including baffle means internally of the silencer element and adjacent said orifices positioned to deflect incoming gas toward the central regions of the silencer element.

4. An assembly as claimed in claim 3 in which the control valve includes a shuttle member slidably mounted at the other end of the tube and carrying a sealing ring carried on the shuttle member, a seat in the valve with which the seating ring co-operates, and resilient means urging the shuttle member into a normal rest position in which the sealing ring is disengaged from the seat and whereby the bore of the tube is connected to atmosphere by way of the valve, the arrangement being such that, when the pressure of gas within the tube exceeds said predetermined value, said pressure urges the shuttle member into a displaced position against the bias of the resilient means and in which the sealing ring sealingly engages the valve seat to close the flow path from the bore of the tube through the valve to atmosphere.

5. An assembly as claimed in claim 4 in which the resilient means comprises a coil spring.

* * * * *